United States Patent Office 3,462,473
Patented Aug. 19, 1969

3,462,473
PHENOXYPHENYL ALKANESULFONATES
Norman A. Nelson, Galesburg, and Gary E. Vanden Berg, Kalamazoo, Mich., assignors to The Upjohn Company, Kalamazoo, Mich., a corporation of Delaware
No Drawing. Filed Mar. 6, 1967, Ser. No. 620,632
Int. Cl. C07c 143/68, 139/00
U.S. Cl. 260—456    4 Claims

ABSTRACT OF THE DISCLOSURE

This invention is directed to phenoxyphenyl alkanesulfonates which are useful as hypocholesterolemic and hypotriglyceridemic agents.

Background of the invention

It is known that relatively high serum cholesterol and triglyceride levels are injurious to arterial tissue and that such injuries may be one of the causes of coronary heart disease and atherosclerosis. It has now been found that the serum lipid level in a mammal, and in particular the cholesterol and the triglyceride levels, can be lowered by administering to the mammal an effective amount of a compound of the present invention.

Summary of the invention

The compounds of the present invention are sulfonates which can be represented by the structural formula I 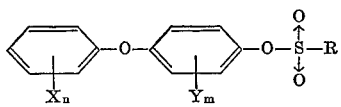

wherein X and Y can be alike or different and can be halo, trifluoromethyl, and alkyl or alkoxy radicals containing from 1 to 4 carbon atoms, inclusive. R can be an alkyl radical containing from 1 to 6 carbon atoms, inclusive, $m$ can be an integer having a value from 0 to 2, inclusive, and $n$ can be an integer having a value from 0 to 3, inclusive. The compounds of this invention are useful as hypocholesterolemic and hypotriglyceridemic agents.

Detailed description of the invention

The compounds of this invention can be prepared by reacting a phenol of the type II 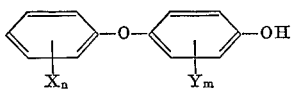

where X, Y, $m$, and $n$ have the same meaning as above, with an alkanesulfonyl halide represented by the formula III    R—SO$_2$—Halogen wherein R is an alkyl containing from 1 to 6 carbon atoms, inclusive, and "Halogen" preferably is chlorine or bromine.

Thus in Formulas I and II illustrative halo radicals are fluoro, chloro, bromo, and iodo.

Illustrative alkyl radicals are methyl, ethyl, propyl, isopropyl, butyl, isobutyl, sec.-butyl, tert.-butyl, the pentyls, and the hexyls.

Illustrative alkoxy radicals are methoxy, ethoxy, propoxy, isopropoxy, butoxy, isobutoxy, sec.-butoxy, and tert.-butoxy.

The alkanesulfonyl halides represented by Formula III are a known class of compounds and some are commercially available. Methods of preparation can be found in J. Am. Chem. Soc. 58, 1348 (1936); J. Am. Chem. Soc. 59, 1837, 2439 (1937); J. Am. Chem. Soc. 60, 1486 (1938).

Illustrative of the alkanesulfonyl halides of Formula III are methanesulfonyl chloride, ethanesulfonyl chloride, butanesulfonyl chloride, propanesulfonyl chloride, 1-methylethanesulfonyl chloride, sec.-butanesulfonyl chloride, isobutanesulfonyl chloride, pentanesulfonyl chloride, hexanesulfonyl chloride, etc.

The reaction is usually carried out in a suitable organic solvent which is also an acid acceptor, such as pyridine, the alkyl-substituted pyridines, N,N-dimethylaniline, tertiary alkylamines such as triethylamine, triisopropylamine, etc., with or without an inert cosolvent such as methylene chloride, chloroform, tetrahydrofuran, ether, benzene, or the like. Pyridine is the preferred solvent.

The reaction temperature can be as low as about 0° C., or lower, or as high as about 60° C., or higher. Preferably the reaction is carried out at room temperature.

The reaction time can range from about 0.1 to about 30 hours, depending on the reaction temperature, the reactants, etc.

After the reaction, the desired product can be recovered employing conventional laboratory techniques. That is, the admixture obtained from the reaction can be diluted with water, the reaction product isolated by filtration or by extraction with a water-immiscible organic solvent, and the resulting solution washed with a dilute acid such as hydrochloric acid, for example, a dilute base such as a dilute aqueous solution of sodium hydroxide or potassium hydroxide, for example, and with water. Thereafter, the washed solution can be dried with anhydrous sodium sulfate or magnesium sulfate, and then concentrated by distillation or evaporation. If necessary, the obtained product can be purified by crystallization if a solid or by high vacuum distillation if a liquid.

The phenols represented by Formula II are a known class of compounds, many of which are commercially available. Methods for their preparation can be found in the literature, for example, Biochem. J. 21, 169 (1927); J. Am. Chem. Soc. 61, 2472 (1939); and J. Med. Chem. 6, 554 (1963).

Illustrative of the phenols of Formula II are 4-phenoxyphenol, 2 - chloro - 4 - phenoxyphenol, 2 - bromo-4 - phenoxyphenol, 2 - ethoxy - 4 - phenoxyphenol, 2-propoxy - 4 - phenoxyphenol, 2 - trifluoromethyl - 4-phenoxyphenol, 2-butyl-4-phenoxyphenol, etc.

Also illustrative are 4-(2-fluorophenoxy)phenol, 4-(4-iodophenoxy)phenol, 2,5 - dimethyl-4-(4-trifluoromethylphenoxy)-phenol, 2,6-dibromo-4-phenoxyphenol, 2,6-diethoxy-4-(2-fluorophenoxy)-phenol, 4-(2,6-diiodo-4-methylphenoxy)phenol, 2,6 - diiodo - 4-(2,6-diiodo-4-methylphenoxy)phenol, 4-(2,4,5-trichlorophenoxy)phenol, 2,6-dichloro-4-(2,4,5-trimethoxyphenoxy)phenol, 4 - (2-isopropyl-5-methylphenoxy)phenol, 2 - methyl - 4-phenoxyphenol, 4-(3,5-dimethyl-4-methoxyphenoxy)phenol, 3,5-diiodo-4-(3,5-dimethyl-4-methoxyphenoxy)phenol, etc.

Compounds within the purview of Formula I can also be prepared through the coupling of a bis(alkanesulfonate) of 2,6-dinitrohydroquinone with an alkoxyphenol. The coupling can be carried out by refluxing the reactants in a suitable solvent such as pyridine for a time period in the range from about 1 minute to about 60 minutes.

The bis(alkanesulfonates) of 2,6-dinitrohydroquinone are a known class of compounds and can be prepared in accordance with the teachings of Schawartz, Acta Chim. Acad. Sci. Hung. 20, 415–18 (1959), [C.A. 54, 12033c (1960)]. Similarly, suitable alkoxyphenols can be prepared by the Elbs reaction as set forth in J. Chem. Soc. 2303 (1948). Illustrative alkoxyphenols are 4-methoxyphenol, 4-ethoxyphenol, 4-propoxyphenol, 4-butoxyphenol, 4-isobutoxyphenol, 3-methyl-4-methoxyphenol, 2,3-dimethyl-4-methoxyphenol, 2 - isopropyl-5-methyl-4-methoxyphenol, and the like.

The nitro groups remaining on the coupled product can be reduced to amino groups by catalytic hydrogenation with palladium-on-carbon catalyst or with Raney nickel catalyst in a suitable solvent such as acetic acid, propionic acid, tetrahydrofuran, the lower aliphatic alcohols, and the like, and the amino groups, in turn, can be replaced by halogens via the corresponding bisdiazonium salt and the Sandmeyer reaction.

The compounds of this invention have lipid-normalizing activity and thus are useful as hypochloreterolemic agents and as hypotriglyceridemic agents in mammals.

For purposes of administration, the compounds of this invention can be combined with solid or liquid pharmaceutical carriers and formulated in the form of tablets, powder packets, or capsules, using starch or similar excipients, or dissolved or suspended in suitable solvents or vehicles for oral or parenteral administration. If desired, the active ingredients can also be admixed with food.

The amount of the active ingredient that is to be administered depends on the age, weight, and condition of the recipient, and also on factors such as the frequency and route of administration.

The daily dose range can be from about 0.3 mg./kg. of body weight to about 50 mg./kg. of body weight.

The present invention is further illustrated by the following examples:

EXAMPLE I

Preparation of p-phenoxyphenyl methanesulfonate p-Phenoxyphenol (about 100 grams, 0.54 mole) was dissolved in pyridine (about 250 milliliters). To the resulting solution was added methanesulfonyl chloride (about 50 milliliters, 0.66 mole) and the resulting mixture cooled to about 15°–17° C. in a water bath. After about 15 minutes the water bath was removed and the mixture was permitted to stand at about room temperature for about 18 hours.

Thereafter, the mixture was combined with ice and water (about 1 liter) and the admixture produced by the combination stirred well.

Solids were isolated therefrom by filtration, and the obtained filter cake was washed successively with aqueous 1 N hydrochloric acid solution, aqueous 1 N sodium hydroxide solution, aqueous 1 N hydrochloric acid solution, and twice with water.

The recovered solids were then dissolved in methylene chloride-ethyl acetate and a water layer separated from the resulting solution. The remaining organic layer was dried by filtration through a pad of anhydrous magnesium sulfate. The obtained filtrate was then concentrated to a volume of about 500 milliliters and a mixture of hexanes was added thereto until crystals formed. The crystals were recovered, dried in vacuo and weighed. About 114 grams (about 80 percent yield) of crystals having a melting point of 99° to 101° C. were obtained. Further recrystallization from methylene chloride-ethyl acetate-mixture of hexanes raised the melting point to 100° to 102° C. The crystals were identified as p-phenoxyphenyl methanesulfonate.

*Analysis.*—For $C_{13}H_{12}O_4S$: Calc'd: C, 59.07; H, 4.58; S, 12.13. Found: C, 59.00; H, 4.61; S, 11.88.

In a manner similar to the above, about equimolar amounts of other phenoxyphenols can be reacted with an alkanesulfonyl chloride to produce the corresponding phenoxyphenyl alkanesulfonate. For example, the reaction of 2-chloro-4-phenoxy-phenol with ethanesulfonyl chloride produces 2-chloro-4-phenoxyphenyl ethanesulfonate, the reaction of 2-trifluoromethyl-4-phenoxyphenol with butanesulfonyl chloride produces 2-trifluoromethyl-4-phenoxyphenyl butanesulfonate, the reaction of 4-(2-fluorophenoxy)phenol with hexanesulfonyl chloride produces 4-(2-fluorophenoxy)phenyl hexanesulfonate, the reaction of 2,5-dimethyl-4-(4-trifluoromethylphenoxy)phenol with pentanesulfonyl chloride produces 2,5-dimethyl-4-(4 - trifluoromethylphenoxy)phenyl pentanesulfonate, the reaction of 2,6-diethoxy-4-(2-fluorophenoxy)phenol with methanesulfonyl chloride produces 2,6-diethoxy-4-(2-fluorophenoxy)phenyl methanesulfonate, the reaction of 4-(2,4,5-trimethoxyphenoxy)phenol with methanesulfonyl chloride produces 4-(2,4,5-trimethoxyphenoxy)phenyl methanesulfonate, the reaction of 2,6-diiodo - 4 - (2,6-diiodo-4-methylphenoxy)phenol with propanesulfonyl chloride produces 2,6-diiodo-4-(2,6-diiodo-4-methylphenoxy)phenyl propanesulfonate, etc.

EXAMPLE II

Preparation of p-phenoxyphenyl butanesulfonate

A mixture of p-phenoxyphenol (about 9.8 grams), pyridine (about 30 milliliters), and butanesulfonyl chloride (about 8.6 grams) was prepared and permitted to stand at about room temperature for about 6 hours. Thereafter, the mixture was diluted with an aqueous hydrochloric acid solution and with a diethyl ether-methylene chloride mixture.

The resulting aqueous and organic layers were separated, and the organic layer was washed with a dilute aqueous acid solution, a dilute aqueous base solution, and with water. Then the washed organic layer was dried and concentrated by evaporation.

The produced residue was chromatographed on a silica gel column using 10 volume percent methanol in benzene to elute a product from the column. Distillation of the eluted product gave about 4.1 grams of a liquid having a boiling point of about 190° to 193° C. at about 0.1 mm. of Hg pressure. The liquid was identified as p-phenoxyphenyl butanesulfonate.

*Analysis.*—For $C_{10}H_{18}O_4S$: Calc'd: C, 62.72; H, 5.92. Found: C, 62.47; H, 6.15.

EXAMPLE III

Preparation of 3,5-dinitro-4-(3,5-dimethyl-4-methoxyphenoxy)phenyl methanesulfonate The bis(methanesulfonate) of 2,6-dinitrohydroquinone (about 10 grams, 0.028 mole) was added to pyridine (about 100 milliliters) and mechanically stirred for about five minutes. Then 3,5-dimethyl-4-methoxyphenol (about 4.7 grams, 0.031 mole) was added thereto and the obtained mixture heated rapidly to about 100° C. and maintained at that temperature for about 10 minutes.

The produced reaction mixture was then cooled to about 25° C. and poured into dilute hydrochloric acid (about 120 milliliters of concentrated hydrochloric acid diluted with water to about 500 milliliters) at about 0° C. Solids were removed from the reaction mixture by filtration, washed with a small amount of water, and then dissolved in a minimum of hot methanol.

The methanol solution was filtered and water added to the filtrate until crystals were observed to form. The crystals were isolated by filtration and then dried in vacuo. About 4.6 grams of crystalline material melting at 106° C. was obtained. Two recrystallizations from methanol-water elevated the melting point to 110.5° to 111.5° C. The crystalline material was identified as 3,5-dinitro-4-(3,5-dimethyl-4-methoxyphenoxy)phenyl methanesulfonate, obtained in about 40 percent yield.

*Analysis.*—For $C_{16}H_{16}N_2O_9S$: Calc'd: C, 46.60; H, 3.91; N, 6.79; S, 7.78. Found: C, 46.47; H, 3.99; N, 6.92; S, 8.05.

EXAMPLE IV

Preparation of 3,5-diiodo-4-(3,5-dimethyl-4-methoxyphenoxy)phenyl methanesulfonate The 3,5-dinitro-4-(3,5-dimethyl-4 - methoxyphenoxy) phenyl methanesulfonate (about 11.55 grams) was dissolved in glacial acetic acid (about 100 milliliters) and was reduced at an initial hydrogen pressure of about 30 p.s.i.g. using a 10 percent palladium-on-charcoal catalyst (about 3 grams).

After reduction the obtained mixture was filtered through a pad of diatomaceous earth while under a nitrogen atmosphere. The resulting filtrate was treated with sulfuric acid (about 17.5 milliliters) and then added dropwise to a vigorously stirred mixture of sodium nitrate (about 5.1 grams) in concentrated sulfuric acid (about 38 milliliters) and propionic acid (about 75 milliliters). The mixture was maintained at a temperature in the range from about −5° C. to about 10° C. throughout the addition.

After about one hour the produced admixture was added rapidly to a stirred mixture of sodium iodide (about 30 grams), iodine (about 21 grams), urea (about 3.2 grams), water (about 400 milliliters), and chloroform (about 230 milliliters). After addition was complete the stirring was continued for about one hour at about room temperature. Then the stired mixture was heated to about 40° C. and maintained at that temperature for about 10 to 30 minutes.

The chloroform and the aqueous layers of the heated mixture were then separated, and the aqueous layer further extracted with chloroform. The chloroform layers were combined and washed successively with water, an aqueous sodium metabisulfite solution, an aqueous sodium hydroxide solution, and water. The combined chloroform layers were then dried and concentrated by evaporation in vacuo.

The residue produced upon evaporation was chromatographed on a silica gel column packed in a 25 percent ethyl acetate-75 percent cyclohexane slurry. Gradient elution from 7.5 percent ethyl acetate-92.5 percent cyclohexane to 30 percent ethyl acetate-70 percent cyclohexane gave about 5.2 grams of a crystalline material. An analytical sample of the material was recrystallized from methanol and was found to have a melting point of 147° to 148° C. The material was identified as 3,5-diiodo-4-(3,5 - dimethyl - 4 - methoxyphenoxy)phenyl methanesulfonate.

*Analysis.*—For $C_{16}H_{16}I_2O_5S$: Calc'd: C, 33.47; H, 2.81; I, 44.21. Found: C, 34.00; H, 3.63; I, 43.81.

In a similar manner, by treating the above-produced bis-diazonium salt with a slurry of cuprous bromide (about 25 grams) in 48 percent hydrobromic acid (about 30 milliliters) or with cuprous chloride (about 20 grams) in concentrated hydrochloric acid (about 25 milliliters) at about room temperature instead of the treatment with sodium iodide, iodine, urea, and water, the corresponding 3,5-dibromo and 3,5-dichloro derivatives, respectively, can be prepared.

Furthermore, following the procedure set forth in Examples III and IV, above, but starting with a different 4-alkoxyphenol as one of the reactants, the corresponding 3,5-diiodo-4-(3,5-dimethyl-4 - alkoxyphenoxy)phenyl methanesulfonate can be prepared. Also, by a suitable choice of a bis(alkanesulfonate) of 2,6-dinitrohydroquinone, the alkyl moiety R of the final alkanesulfonate of Formula I can be varied.

We claim:

1. A phenoxyphenyl alkanesulfonate represented by the structural formula

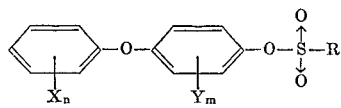

wherein X and Y are members of the grouping consisting of halo, trifluoromethyl, alkyl groups containing from 1 to 4 carbon atoms, inclusive, and alkoxy groups containing from 1 to 4 carbon atoms, inclusive, R is an alkyl group containing from 1 to 6 carbon atoms, inclusive, $m$ is an integer having a value from 0 to 2, inclusive, and $n$ is an integer having a value from 0 to 3, inclusive.

2. The phenoxyphenyl alkanesulfonate in accordance with claim 1 wherein R is a methyl group, and $m$ and $n$ have a value of zero.

3. The phenoxyphenyl alkanesulfonate in accordance with claim 1 wherein R is a butyl group, and $m$ and $n$ have a value of zero.

4. The phenoxyphenyl alkanesulfonate in accordance with claim 1 wherein R is methyl, X is methoxy and methyl, Y is iodo, $n$ has a value of 3, $m$ has a value of 2, and the substituents X and Y are positioned as shown by the formula

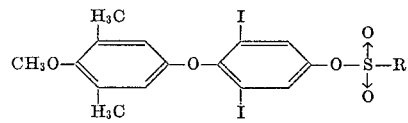

References Cited

UNITED STATES PATENTS

| 3,202,691 | 8/1965 | Wenham et al. | 260—456 |
| 3,064,037 | 11/1962 | Kerwin | 260—473 |
| 3,009,934 | 11/1961 | Counsell et al. | 260—397.4 |

OTHER REFERENCES

M. Freifelder et al., Hypocholesteremic Agents, II, The Hydrogenation of Some Pyridinesulfonic and Pyridine Alkanesulfonic Acids, Journal of Med. Chem. 7 (5), 664 (1964).

BERNARD HELFIN, Primary Examiner

L. DE CRESCENTE, Assistant Examiner

U.S. Cl. X.R.

424—303